(12) United States Patent
Hobbs

(10) Patent No.: US 12,166,393 B2
(45) Date of Patent: Dec. 10, 2024

(54) VIRTUAL MASS SYSTEMS AND METHODS

(71) Applicant: Boyd Randolph Hobbs, Los Angeles, CA (US)

(72) Inventor: Boyd Randolph Hobbs, Los Angeles, CA (US)

(73) Assignee: Nodal Film Systems, LLC, Los Angeles, CA (US)

( * ) Notice: Subject to any disclaimer, the term of this patent is extended or adjusted under 35 U.S.C. 154(b) by 521 days.

(21) Appl. No.: 17/646,757

(22) Filed: Jan. 3, 2022

(65) Prior Publication Data

US 2023/0216363 A1 Jul. 6, 2023

(51) Int. Cl.
| | |
|---|---|
| *H02K 3/26* | (2006.01) |
| *H02K 1/16* | (2006.01) |
| *H02K 1/27* | (2022.01) |
| *H02K 5/04* | (2006.01) |
| *H02K 11/00* | (2016.01) |

(52) U.S. Cl.
CPC ............. *H02K 3/26* (2013.01); *H02K 1/16* (2013.01); *H02K 1/27* (2013.01); *H02K 5/04* (2013.01); *H02K 11/0094* (2013.01)

(58) Field of Classification Search
CPC .. H02K 1/16; H02K 1/27; H02K 3/26; H02K 5/04; H02K 11/0094
USPC ....................................................... 310/67 R
See application file for complete search history.

(56) References Cited

U.S. PATENT DOCUMENTS

| | | | |
|---|---|---|---|
| 8,125,564 B2 | 2/2012 | Kozlov | |
| 8,485,740 B1 | 7/2013 | Chapman | |
| 11,989,361 B1 * | 5/2024 | Vlasov | ............... G06F 3/03543 |
| 2005/0007553 A1 | 1/2005 | Romanoff | |
| 2006/0255683 A1 | 11/2006 | Suzuki | |
| 2014/0340376 A1 | 11/2014 | Itagaki | |
| 2017/0090572 A1 * | 3/2017 | Holenarsipur | ........ G06F 3/0362 |
| 2017/0264385 A1 | 9/2017 | Anderson et al. | |
| 2017/0371430 A1 * | 12/2017 | de Castro | ................ B60Q 9/00 |
| 2018/0198341 A1 * | 7/2018 | Schuler | .................... H02K 3/28 |
| 2019/0391539 A1 * | 12/2019 | Perkins | ................ G01D 5/3473 |
| 2020/0014316 A1 | 1/2020 | Hobbs | |

(Continued)

FOREIGN PATENT DOCUMENTS

WO 2021119672 A1 6/2021

OTHER PUBLICATIONS

Chan, "Telepresence: Design Implementation and study of an HMO Controlled Avatar with a 1-20 Mechatronic Approach", Electrical Engineering Department, California Polytechnic State University, 2015, [online] Available: https://doi.org/10.15368/theses.2015.58.

*Primary Examiner* — Rashad H Johnson
(74) *Attorney, Agent, or Firm* — Lynch LLP

(57) ABSTRACT

Systems and methods of the inventive subject matter are directed to control systems that create virtual mass in a haptic feedback system. Embodiments include a jog knob coupled with a PCB stator motor such that the PCB stator motor can be controlled to give the jog knob a feeling of mass that is different from its actual mass. Thus, a system of the inventive subject matter can be configured to continue a rotation as if it has a higher mass than it actually has, resulting in smoother rotations that last longer. This functionality can be useful to, for example, remotely control a camera's movements while still giving a user the feel of a comparable mechanical system.

20 Claims, 4 Drawing Sheets

(56) References Cited

U.S. PATENT DOCUMENTS

| | | | | |
|---|---|---|---|---|
| 2020/0150766 A1* | 5/2020 | Bagley | ............... | B60K 35/00 |
| 2020/0173538 A1* | 6/2020 | Lotz | ............... | F16H 59/105 |
| 2020/0409464 A1* | 12/2020 | Hobbs | ............... | H02K 24/00 |
| 2021/0188090 A1* | 6/2021 | Kim | ............... | G06F 3/0482 |
| 2024/0157525 A1* | 5/2024 | Zou | ............... | B25B 21/02 |

* cited by examiner

VIRTUAL MASS SYSTEMS AND METHODS

FIELD OF THE INVENTION

The field of the invention is directed to simulating mass to affect rotational inertia of a rotating body.

BACKGROUND

The background description includes information that may be useful in understanding the present invention. It is not an admission that any of the information provided in this application is prior art or relevant to the presently claimed invention, or that any publication specifically or implicitly referenced is prior art.

Control knobs that give a user haptic feedback that improves performance of those knobs are highly desirable in a wide variety of different applications. For example, in the context of controlling a remote motor using a control knob, applying a torque to the control knob to turn it not only causes the knob to turn, but a haptic feedback system can cause the knob to feel heavier (or lighter) than it actually is. In the context of controlling a motor that is responsible for camera movements, historically, rotation of a handwheel for a camera mount was made smooth by virtue of the mass of the system that is rotated by turning the handwheel. Because the weight of the entire system, handwheels in mechanical systems turned smoothly from manual force input to the system (e.g., mechanical handwheel systems had high rotational inertia).

But in new "fly-by-wire" systems, any feeling of weight is divorced from the actual weight of the system. In these systems, electronic input is received that causes a remotely mounted motor to turn. Thus, an individual giving input to the system never directly feels the weight of what they are causing to turn (e.g., a camera system). Without a sense of mass being conveyed to a user, movements input into the system may not be sufficiently smooth.

Several patent documents work to address smooth movements of motor-controlled cameras, but none are directed to solutions that improve user experience via haptic feedback. Instead, the previous solutions work to remove human input entirely. For example, U.S. Pat. No. 8,125,564 to Kozlov et al. describes a gimbal system that facilitates steady camera movements using electric motors. U.S. Pat. No. 8,485,740 to Chapman describes a camera mount system with intricate electronics and motor controllers that create smooth camera movements, but this system also fails to contemplate the importance of feel when controlling a camera, and the system described here fails to give an operator a feel for the camera's movement.

Finally, US20050007553A1 to Romanoff et al. discusses a camera mounted on the end of a boom that, upon moving the boom, the camera is caused to stay focused on a particular location, where the camera's movements are controlled by electric motors. But the purpose of this system is to remove the operator entirely from the task of controlling the movement of the camera in favor of computer-controlled movements. This application fails to appreciate how a haptic feedback system can improve remote controlling of a camera's movements.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that a haptic feedback system can be used in a lightweight rotational control system to create virtual mass in the rotating element of that system.

SUMMARY OF THE INVENTION

The present invention provides apparatuses, systems, and methods directed to creating virtualized mass in a rotating system. In one aspect of the inventive subject matter, a virtual mass system is contemplated, the system comprising: a housing; a printed circuit board (PCB) stator fixedly coupled with the housing; a rotor comprising a set of magnets, the rotor being rotatably coupled with the housing and positioned near the PCB stator to facilitate magnetic interaction between the PCB stator and the set of magnets; an annular jog knob fixedly coupled with the rotor; and a display positioned at least partially within the annular jog knob.

In some embodiments, the system also includes a rotation encoder configured to determine angular position of the rotor. The housing can be circular in shape and have a protruded portion that extends from the center of an interior side of the housing. The rotor can then couple with the housing by a bearing that attaches to the protruded portion. In some embodiments, the protruded portion comprises a hollow middle area that allows wires to extend from a rear portion of the housing to the display. A second rotor can also be included, where the second rotor includes a set of magnets. The second rotor can also be rotatably coupled with the housing and positioned on an opposite side of the PCB stator from the rotor.

In another aspect of the inventive subject matter, another virtual mass system is contemplated, comprising: a housing; a printed circuit board (PCB) stator motor; the PCB stator motor comprising a first rotor and second rotor with a PCB stator positioned therebetween; where the first rotor and the second rotor are coupled with a protruded portion of the housing by a first bearing and a second bearing, respectively, and where the PCB stator is fixedly coupled with the housing; and a jog knob fixedly coupled with the rotor.

In some embodiments, the system also includes a rotation encoder configured to determine angular position of at least one of the rotor and the jog knob. The housing can be circular in shape and include a protruded portion that extends from the center of an interior side of the housing. The first rotor and the second rotor can couple with the housing along the protruded portion. The protruded portion can have a hollow middle area that allows wires to extend from a rear portion of the housing to a display disposed adjacent to the jog knob.

In some embodiments, the PCB stator is fixedly coupled with the housing along at least a portion of an outer edge of the PCB stator. The first rotor and the second rotor, which are positioned on either side of the PCB stator, can have a first set of magnets and a second set of magnets, respectively. In some embodiments, the jog knob is annular, and the system can additionally include a display positioned at least partially within a center portion of the jog knob.

In another aspect of the inventive subject matter, another virtual mass system is contemplated, comprising: a housing; a printed circuit board (PCB) stator fixedly coupled with the housing; a rotor comprising a set of magnets, the rotor being rotatably coupled with the housing and positioned near the PCB stator to facilitate magnetic interaction between the PCB stator and the set of magnets; and a jog knob fixedly coupled with the rotor, where the jog knob and the housing form an enclosed space.

In some embodiments, the system also includes a rotation encoder configured to determine angular position of the rotor. The housing can be circular in shape and have a protruded portion that extends from the center of an interior side of the housing. The rotor can then couple with the housing by a bearing that is coupled with the protruded portion. The system can also include a second rotor have a set of magnets, where the second rotor is rotatably coupled with the housing and positioned on an opposite side of the PCB stator from the rotor.

One should appreciate that the disclosed subject matter provides many advantageous technical effects including the ability to simulate mass in a rotating element to give the feel of a heavier or lighter system.

Various objects, features, aspects, and advantages of the inventive subject matter will become more apparent from the following detailed description of preferred embodiments, along with the accompanying drawing figures in which like numerals represent like components.

DETAILED DESCRIPTION

Figure 1:
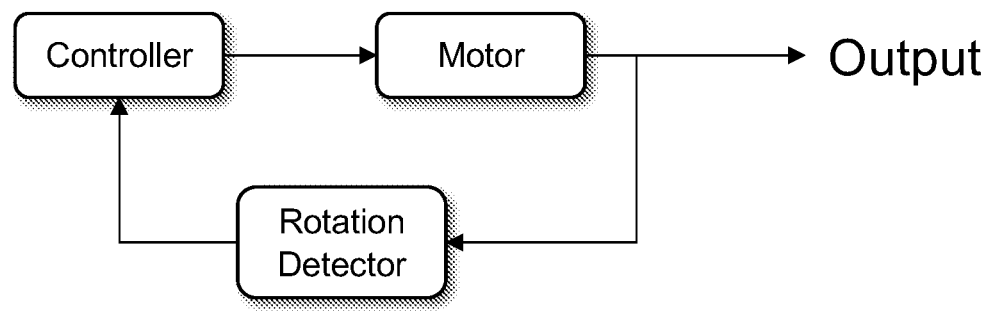
FIG. 1 shows a closed-loop control system of the inventive subject matter.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Embodiments of the inventive subject matter are directed to virtual mass systems that provides haptic feedback to an operator (e.g., systems comprising handwheels, control knobs and dials, etc., that are made to simulate having a mass that is different from their actual mass). Thus, virtual mass systems of the inventive subject matter are able to give a user haptic feedback that can give a rotational input element (e.g., a jog knob) a simulated feeling of weight and rotational inertia that differs from the input element's actual weight and rotational inertia. Virtual mass systems of the inventive subject matter represent a major improvement over any previous system because they are made using printed circuit board (PCB) stator motors that enable dramatically reduced size and complexity compared to previously developed systems.

The ability to create simulated rotational inertia in a virtual mass system comes from coupling a rotational input element to an electric PCB stator motor, where rotation of the jog knob of the virtual mass system (or, in some embodiments, the motor's output or even the motor's stator itself) is detected by a rotation detector (e.g., to determine angular position, angular velocity, and angular acceleration). A controller is then electrically coupled with both the motor and the rotation detector, such that rotation information (e.g., position or change in position) collected by the rotation detector is transmitted to the controller, and the controller uses that information to control the motor's output. Thus, a closed-loop control system is created where angular position information from the motor is fed back into the controller, and the controller accordingly affects the motor's output using that position information. A schematic of a closed-loop system is shown in FIG. 1.

Figure 2:
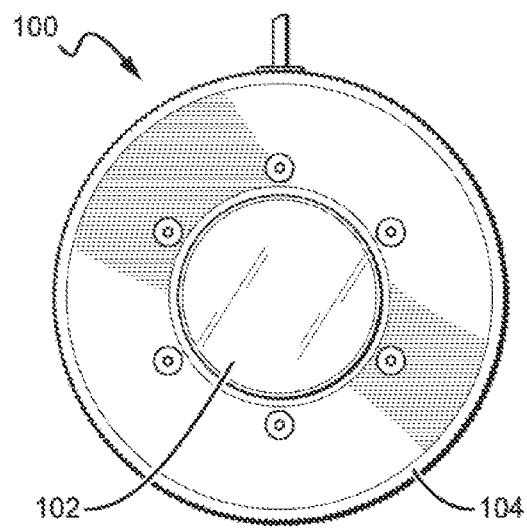
FIG. 2 is a front view of a virtual mass system.
Figure 3:
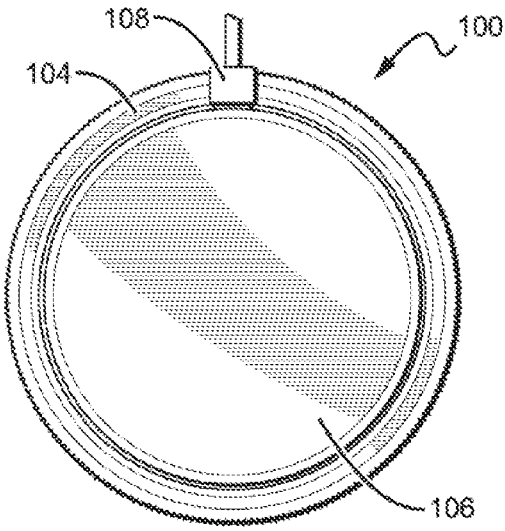
FIG. 3 is a rear view thereof.

FIG. 2 shows virtual mass system 100 from the front, and FIG. 3 shows virtual mass system 100 from the back. From the front, a display screen 102 is shown surrounded by jog knob 104. Jog knob 104 can be, e.g., an annular element having a textured outer surface to improve grip. In some embodiments, the jog knob can feature a coating (e.g., rubber, plastic, or the like) to improve grip. Because embodiments of the inventive subject matter are designed to simulate jog knob mass that is different from the jog knob's actual mass to create an apparent increase in rotational inertia of the jog knob, jog knobs of the inventive subject matter can be made from lightweight materials (e.g., plastics, metals, alloys, composite materials, etc.). Display screen 102 can be configured as a touch screen to provide additional input. To maximize surface area for the display screen 102, it is shown with a circular form factor nested within an opening in jog knob 104. Screws 110 are also shown going into jog knob 104 to fasten it to front rotor 112. In some embodiments, jog knob 104 is coupled with front rotor 112 by pressure fit, by clipping onto the rotor, or by adhesive. From the back, housing 106 is shown. Jog knob 104 is configured to rotate relative to housing 106, and housing 106 comprises an opening for I/O port 108 (e.g., a serial port to couple with a USB cable such as USB-C).

Figure 4:
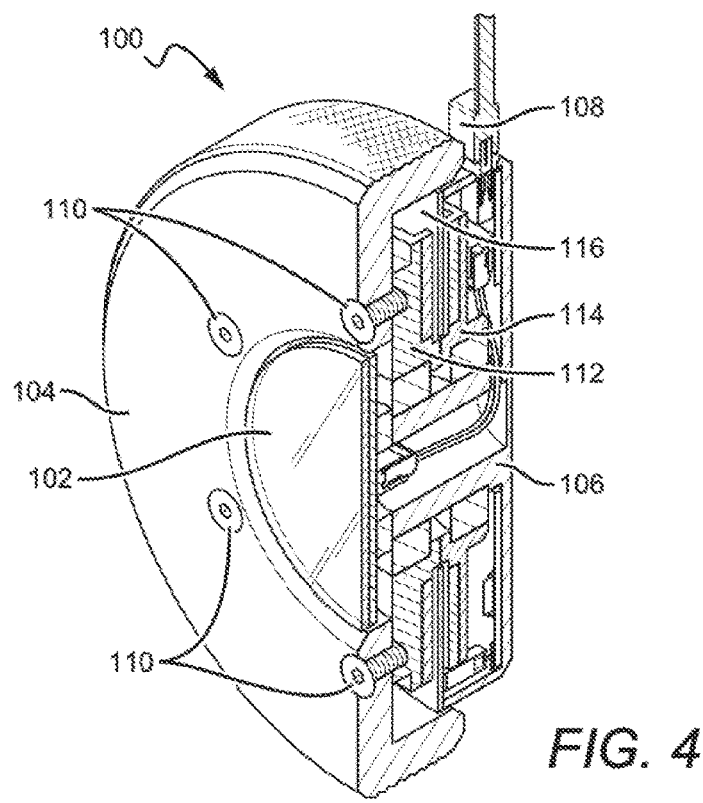
FIG. 4 is a cutaway view thereof.
Figure 5:
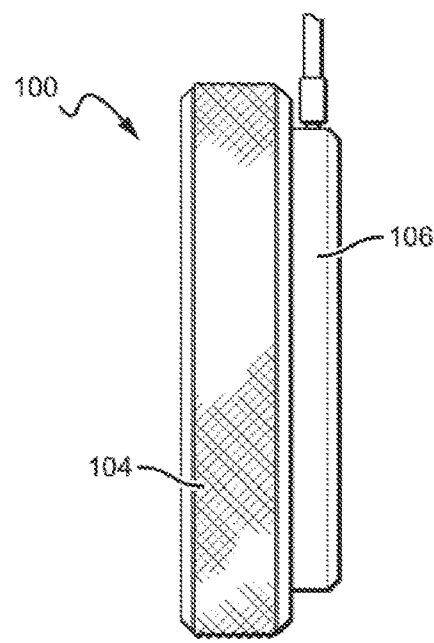
FIG. 5 is a side view thereof.

FIG. 4 shows a cutaway view of virtual mass system 100. In this view, many of the system's components are visible. On the exterior is jog knob 104 as well as display 102. As mentioned above, embodiments of the inventive subject matter are especially unique for their use of PCB stator motors. Jog knob 104 is thus shown coupled with front rotor 112 of an internally disposed PCB stator motor by screws 110. In between front rotor 112 and rear rotor 114 is PCB stator 116. PCB stator 116 couples with housing 106 at its edges such that front rotor 112 and rear rotor 114, which are coupled to one another, can rotate relative to stator 116. FIG. 5 shows virtual mass system 100 from the side. From this view, jog knob 104 and housing 106 are visible. When using virtual mass system 100, a user would rotate jog knob 104 relative to housing 106. Housing 106 is intended to remain stationary (e.g., set on, or otherwise fastened to, a surface). In some embodiments, housing 106 comprises a magnetic material such that it can be coupled with surfaces made from materials that magnets are attracted to.

Figure 6:
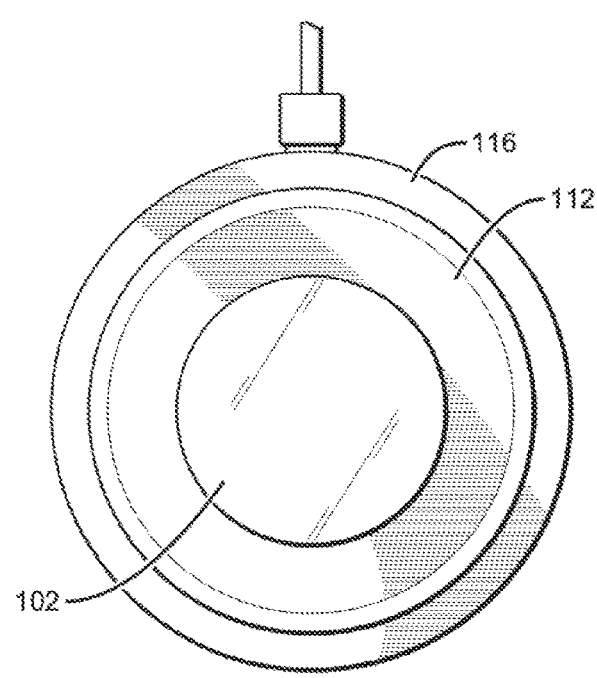
FIG. 6 is a front view showing select internal components thereof.
Figure 7:
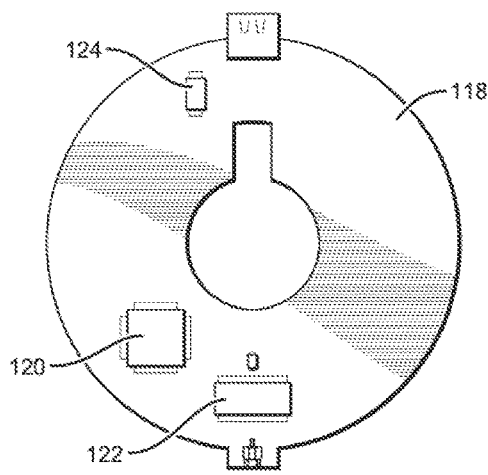
FIG. 7 is a rear view of FIG. 6.

FIG. 6 shows some internal components of virtual mass system 100. Display 102 is visible, as well as front rotor 112 and stator 116. FIG. 7 shows controller PCB 118, which has coupled with it both an optical encoder integrated circuit (IC) 120, a motor controller IC 122 (e.g., a 3-phase motor controller), and an I/O controller IC 124 (e.g., a USB interface IC). Additional IC components can be included as needed to facilitate functions disclosed in this application.

Optical encoders use a light that shines onto a photodiode through slits in a disk, although reflective versions also exist. Optical encoders can be sensitive to dust but are otherwise robust and easy to implement. As the disk that is fixed to a rotating component rotates, light shines through the slits allowing the rotation to be detected. Optical encoders can be configured to determine both direction of rotation and angular position/change in angular position.

In some embodiments, different rotation detectors can be implemented, including: a conductive encoder, an on-axis magnetic encoder, an off-axis magnetic encoder, etc. A conductive encoder includes a series of circumferential copper tracks etched onto a printed circuit board (PCB), which is used to encode information about the handwheel's rotation. In conductive encoders, contact brushes sense the copper tracks and rotation direction and magnitude can be detected.

On-axis magnetic encoders typically use a specially magnetized 2-pole neodymium magnet attached to the motor shaft. Because it can be fixed to the end of the shaft, it can work with motors that only have 1 shaft extending out of the motor body. The accuracy can vary from a few degrees to under 1 degree. Resolutions can be, for example, as low as 1 degree or as high as 0.09 degree. Poorly designed internal interpolation can cause output jitter, but this can be overcome with internal sample averaging.

Off-axis magnetic encoders typically use rubber-bonded ferrite magnets attached to a metal hub. This offers flexibility in design and low cost for custom applications. Due to the flexibility in many off-axis encoder chips they can be programmed to accept any number of pole widths, so the chip can be placed in any position required for the application. Magnetic encoders operate in harsh environments where optical encoders would fail to work.

Figure 8:
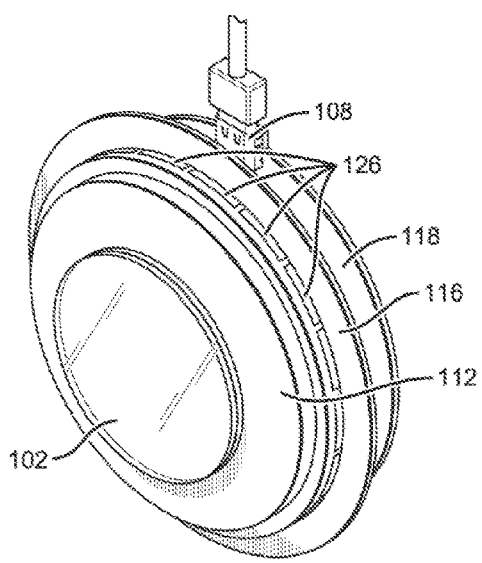
FIG. 8 is an isometric view of FIG. 6.
Figure 9:
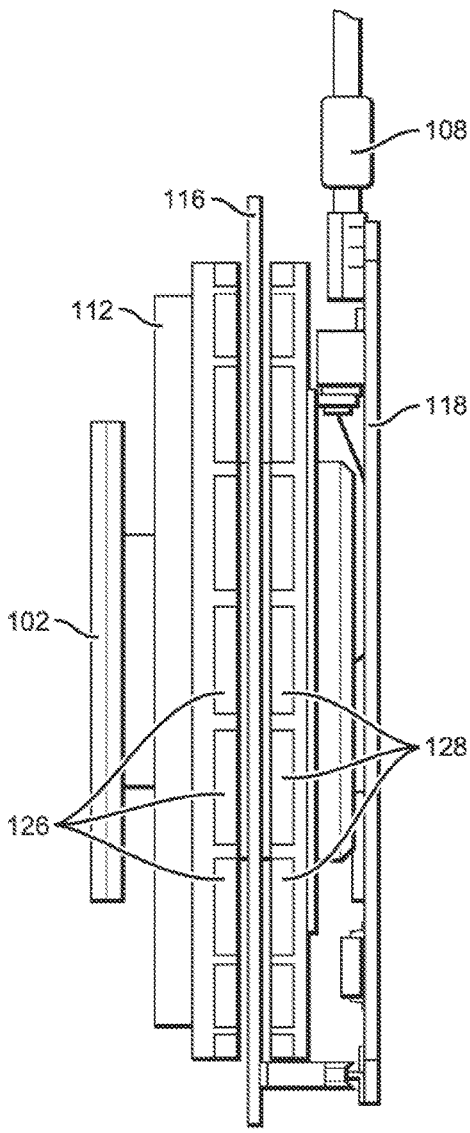
FIG. 9 is a side view of FIG. 6.
Figure 10:
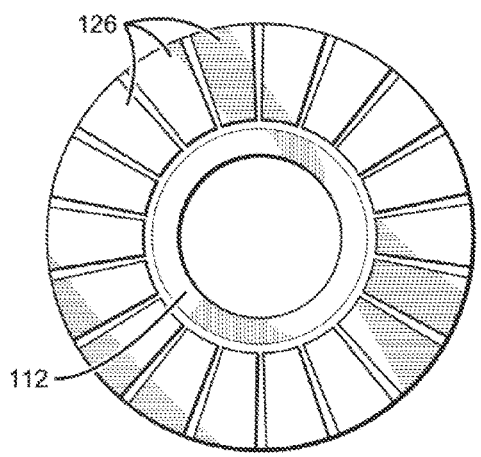
FIG. 10 shows a rotor with attached magnets.

FIG. 8 shows an isometric view of the same components shown in FIG. 6, and FIG. 9 shows FIG. 8 from the side. From this perspective several more components are additionally visible. Thus, display 102, front rotor 112, PCB stator 116, controller PCB 118, I/O port 108, and finally front magnets 126. Front magnets 126 are fixedly coupled with front rotor 112. FIG. 10 shows front rotor 112 from a rear view such that front magnets 126 are visible. A plurality of these magnets are used such that the PCB stator 116 can cause rotation of front rotor 112 (as well as the rear rotor that has rear magnets affixed thereto). Display 102 does not rotate with front rotor 112 and is instead coupled with housing 106.

Figure 11:
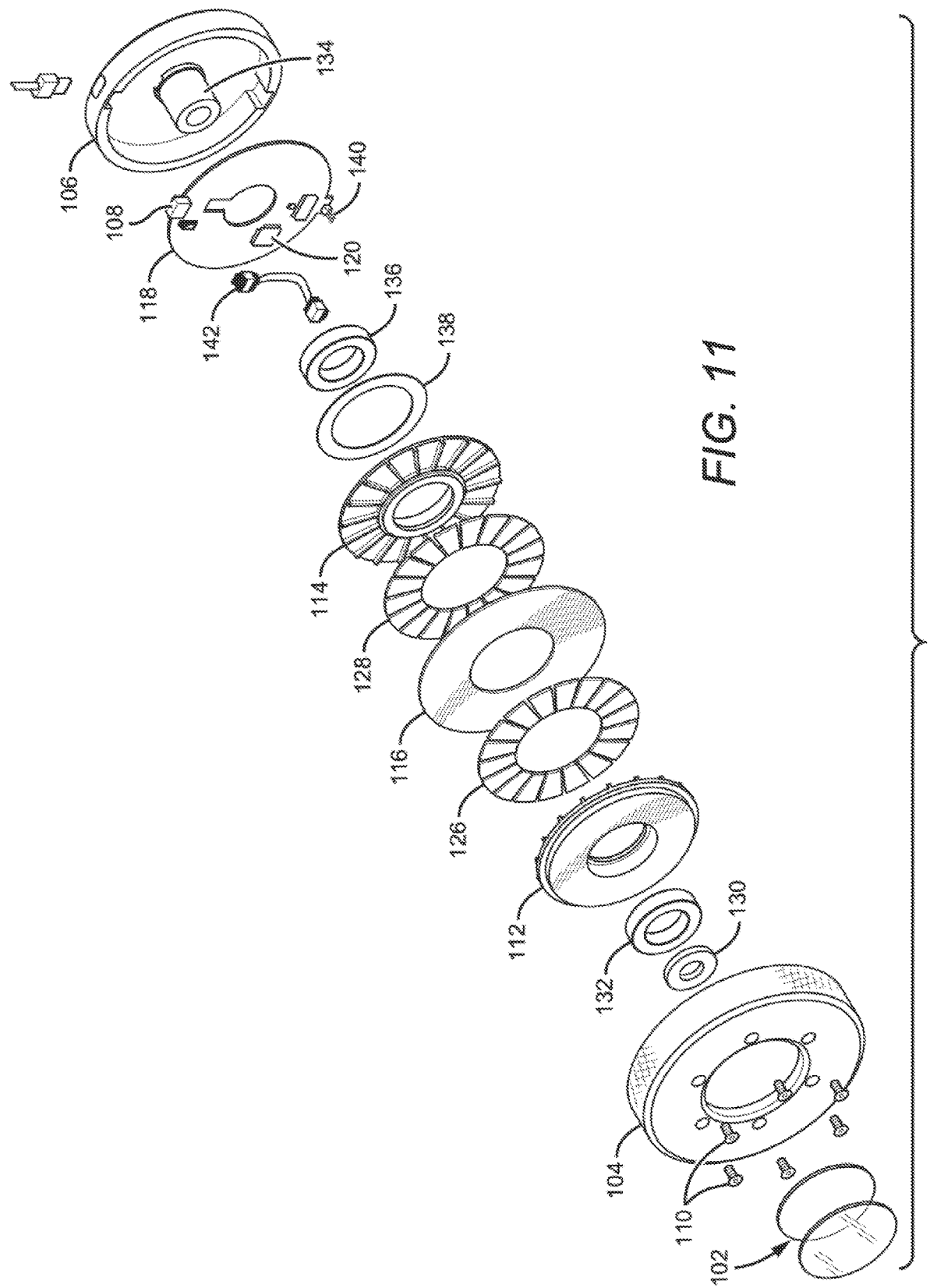
FIG. 11 is an exploded view the virtual mass system.

Finally, FIG. 11 shows an exploded view of virtual mass system 100. This view shows still further components that are not all visible in the figures described above. Starting on the left side of the image is display 102, which is shown with both a transparent cover (e.g., glass, acrylic, plastic, etc.) as well as the display portion. Screws 110 are exploded away from jog knob 104, though once coupled together, screws 110 pass through jog knob 104 and into front rotor 112.

Next is retaining ring 130, which couples with an end portion of housing 106 after that end portion of housing 106 passes through the other annular components (e.g., the PCB stator, the rotors, bearings, etc.). Retaining ring 130 can also function as a display mount, where its annular shape allows wiring to pass therethrough to reach display 102. Because retaining ring 130 is fixedly coupled with housing 106, it does not rotate when jog knob 104 rotates. Front bearing 132 couples with mounting post 134, which is part of housing 106. Front rotor 112 couples with bearing 132 such that front rotor 112 can rotate relative to housing 106. Coupled with front rotor 112 are front magnets 126, which are arranged as wedges. This configuration facilitates rotation caused by PCB stator 116. Rear magnets 128, like front magnets 126, are coupled with rear rotor 114, and rear rotor is coupled with rear bearing 136. Rear bearing 136 couples with mounting post 134 such that rear rotor 114 can rotate relative to housing 106.

Positioned near rear rotor 114 is an optical encoder 138, which is configured to measure angular position of rear rotor 114 (and, by extension, angular position of front rotor 112 and jog knob 104, since these components all rotate together). Controller PCB 118 is then positioned near the bottom of housing 106. Controller PCB 118 additionally features pins 140 that couple with PCB stator 116, such that signals from motor controller IC 122 can be transmitted to PCB stator 116 to cause front and rear rotors to rotate or to resist rotation. Controller PCB 118 also includes a display cable 142 that runs through the middle of the system to couple with display 102. And finally, housing 106 is configured to contain all these components as shown in, e.g., FIGS. 2, 3, 4, and 5.

Systems and methods of the inventive subject matter can be implemented in a variety of different applications. For example, in some embodiments, a virtual mass system of the inventive subject matter can be used as a controller for the rotational position of a motor about one or more axes. A camera operator can thus turn the jog knob of such a system to cause a camera to pan or tilt. And because systems of the inventive subject matter are configured to simulate mass, the jog knob can be configured to feel heavier than it actually is, thus improving smoothness of rotation of the motor coupled with the camera. In such an embodiment, the motor coupled with the camera rotates according to some function of rotation of the jog knob (e.g., a linear relationship, a non-linear relationship, etc.).

Thus, systems of the inventive subject matter can take rotational information (e.g., one or any combination of angular position, angular velocity, and angular acceleration) of the jog knob and cause a remotely located motor to turn to match the turning of the handwheel (e.g., at any ratio of handwheel turning to motor turning, or even according to some non-linear function). For example, a remotely located motor can include a controller that causes the motor to turn according to the turning of the handwheel (e.g., a PID, PI, ID, PD, I, P, or D control scheme or even just a matching the turning of the handwheel according to angular position at any ratio of handwheel turns to remotely located motor turns).

FIG. 12 shows how a system of the inventive subject matter handles data to give rise to simulated mass in a jog knob. A microprocessor 200 takes in physics parameters 202, power 204, and angular position feedback from encoder 206. Physics parameters 202 can be user-defined. For example, a user-defined physics parameter can include a desired jog knob mass, which impacts rotational inertia and angular momentum. A user-defined jog knob mass also impacts how the motor drive responds to a user's input (e.g., rotation of the jog knob). Thus, microprocessor is coupled with a motor driver 208 such that microprocessor 200 transmits a signal (e.g., a pulse-width modulated signal or a digital signal) to cause the motor driver to drive PCB stator motor to rotate.

When PCB stator motor rotates, it causes jog knob 212 to rotate (because, as described above, the PCB stator motor is coupled with the jog knob such that the components rotate together). Encoder 206 thus determines an angular position of the jog knob (or PCB stator, depending on configuration) and feeds that angular position information back to the microprocessor 200. This allows microprocessor to drive PCB stator 210 via motor driver 208 such that jog knob 212 feels as if it has, e.g., a higher mass than it actually does. In some embodiments, microprocessor 200 and motor driver 208 are included in the same integrated circuit component.

In an example, as the jog knob 212 is turned by a human operator (e.g., the jog knob undergoes angular position change), the encoder 206 collects angular position data and sends that to the microprocessor 200, and the microprocessor 200 uses that information to drive the PCB stator 210 (e.g., via motor driver 208).

The microprocessor 200 continuously receives angular position information and uses it to calculate information about jog knob 212 (e.g., angular position, angular velocity, angular acceleration, or a change in any of those terms). Microprocessor 200 then sends signals to the motor driver 208 to drive the PCB stator 210 to bring about the effect of simulated mass in jog knob 212 that differs from jog knob's actual mass. For example, microprocessor 200 and motor driver 208 drive PCB stator 210 (and therefore jog knob 212) in a direction opposite of the jog knob's angular position change to make it feel like the jog knob 212 is heavier than it actually is.

For example, if the jog knob 212 undergoes an angular acceleration (e.g., by user input), the encoder 206 continuously passes angular position information to the microprocessor 200 such that the microprocessor 200 can calculate the handwheel's angular acceleration, and the microprocessor 200 then instructs the motor driver 208 to "brake" the PCB stator motor 210 (e.g., apply torque in a direction opposite of the jog knob's angular acceleration—in this case, negative angular acceleration) to resist the jog knob's positive angular acceleration, giving the jog knob 212 a simulated weight that, to the human operator, feels a heavier than the jog knob 212 would ordinarily feel. Once jog knob 212 is turning, the microprocessor 200 can thus cause jog knob 212, via the motor driver 208, to continue to turn as if it has a higher rotational inertia than it actually has.

Thus, specific systems and methods directed to simulated mass in rotating bodies have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A virtual mass system, comprising:
a housing;
a printed circuit board (PCB) stator fixedly coupled with the housing;
a rotor comprising a set of magnets, the rotor being rotatably coupled with the housing and positioned near the PCB stator to facilitate magnetic interaction between the PCB stator and the set of magnets;
an annular jog knob fixedly coupled with the rotor; and
a display positioned at least partially within the annular jog knob.

2. The virtual mass system of claim 1, further comprising a rotation encoder configured to determine angular position of the rotor.

3. The virtual mass system of claim 1, wherein the housing is circular in shape and comprises a protruded portion that protrudes from the center of an interior side of the housing.

4. The virtual mass system of claim 3, wherein the rotor couples with the housing by a bearing that is coupled with the protruded portion.

5. The virtual mass system of claim 3, wherein the protruded portion comprises a hollow middle area that allows wires to extend from a rear portion of the housing to the display.

6. The virtual mass system of claim 1, further comprising a second rotor comprising a set of magnets, the second rotor being rotatably coupled with the housing and positioned on an opposite side of the PCB stator from the rotor.

7. A virtual mass system, comprising:
a housing;
a printed circuit board (PCB) stator motor;
the PCB stator motor comprising a first rotor and second rotor with a PCB stator positioned therebetween;
wherein the first rotor and the second rotor are coupled with a protruded portion of the housing by a first bearing and a second bearing, respectively;
wherein the PCB stator is fixedly coupled with the housing; and
a jog knob fixedly coupled with the rotor.

8. The virtual mass system of claim 7, further comprising a rotation encoder configured to determine angular position of at least one of the rotor and the jog knob.

9. The virtual mass system of claim 7, wherein the housing is circular in shape and comprises a protruded portion that protrudes from the center of an interior side of the housing.

10. The virtual mass system of claim 9, wherein the first rotor and the second rotor couple with the housing along the protruded portion.

11. The virtual mass system of claim 9, wherein the protruded portion comprises a hollow middle area that allows wires to extend from a rear portion of the housing to a display disposed adjacent to the jog knob.

12. The virtual mass system of claim 7, wherein the PCB stator is fixedly coupled with the housing along at least a portion of an outer edge of the PCB stator.

13. The virtual mass system of claim 7, wherein the first rotor and the second rotor comprise a first set of magnets and a second set of magnets, respectively.

14. The virtual mass system of claim 7, wherein the jog knob is annular.

15. The virtual mass system of claim 14, further comprising a display positioned at least partially within a center portion of the jog knob.

16. A virtual mass system, comprising:
a housing;
a printed circuit board (PCB) stator fixedly coupled with the housing;
a rotor comprising a set of magnets, the rotor being rotatably coupled with the housing and positioned near the PCB stator to facilitate magnetic interaction between the PCB stator and the set of magnets;
a jog knob fixedly coupled with the rotor; and
wherein the jog knob and the housing form an enclosed space.

17. The virtual mass system of claim 16, further comprising a rotation encoder configured to determine angular position of the rotor.

18. The virtual mass system of claim 16, wherein the housing is circular in shape and comprises a protruded portion that protrudes from the center of an interior side of the housing.

19. The virtual mass system of claim 18, wherein the rotor couples with the housing by a bearing that is coupled with the protruded portion.

20. The virtual mass system of claim 16, further comprising a second rotor comprising a set of magnets, the second rotor being rotatably coupled with the housing and positioned on an opposite side of the PCB stator from the rotor.

* * * * *